(12) United States Patent
Merriam et al.

(10) Patent No.: US 11,299,862 B1
(45) Date of Patent: Apr. 12, 2022

(54) PORTABLE STREET PLANTER

(71) Applicant: Studio5051, LLC, Minneapolis, MN (US)

(72) Inventors: Howard Marshall Merriam, Minneapolis, MN (US); Susan Altenbach, Minneapolis, MN (US)

(73) Assignee: Studio5051, LLC, Minneapolis, MN (US)

( * ) Notice: Subject to any disclaimer, the term of this patent is extended or adjusted under 35 U.S.C. 154(b) by 59 days.

(21) Appl. No.: 16/553,265

(22) Filed: Aug. 28, 2019

Related U.S. Application Data

(60) Provisional application No. 62/724,315, filed on Aug. 29, 2018.

(51) Int. Cl.
| | | |
|---|---|---|
| *A01G 9/28* | (2018.01) | |
| *A01G 9/02* | (2018.01) | |
| *E01F 15/00* | (2006.01) | |
| *A47C 16/02* | (2006.01) | |

(52) U.S. Cl.
CPC .............. *E01F 15/006* (2013.01); *A01G 9/02* (2013.01); *A01G 9/28* (2018.02); *A47C 16/02* (2013.01)

(58) Field of Classification Search
CPC . A01G 9/02; A01G 9/021; A01G 9/00; A47C 16/02
USPC ......................................... 297/423.41, 423.4
See application file for complete search history.

(56) References Cited

U.S. PATENT DOCUMENTS

| | | | | | |
|---|---|---|---|---|---|
| 2,058,934 | A | * | 10/1936 | Yohe .................. | A01G 9/02 47/79 |
| 3,006,496 | A | * | 10/1961 | Weiman ............... | B65D 9/12 217/12 R |
| 3,033,309 | A | * | 5/1962 | Fugere ................ | E06C 1/381 182/90 |
| 4,019,279 | A | * | 4/1977 | Moorman ............. | A01G 9/00 47/32.8 |
| 4,222,136 | A | * | 9/1980 | Valentino ............. | A47C 21/00 182/92 |
| 4,313,589 | A | * | 2/1982 | Vega .................. | A47B 23/04 248/444.1 |
| 4,524,475 | A | * | 6/1985 | Valentino ............. | A47C 21/00 182/91 |
| 4,796,383 | A | * | 1/1989 | Inoue ................. | A01G 9/029 47/73 |
| 4,809,851 | A | * | 3/1989 | Oestreich, Jr ......... | B65D 7/32 206/599 |
| 5,161,709 | A | * | 11/1992 | Oestreich, Jr. ........ | B65D 19/12 220/1.5 |
| 5,387,049 | A | | 2/1995 | Duckett | |
| 5,597,084 | A | * | 1/1997 | Parasin .............. | B65D 11/1873 206/600 |
| 5,642,541 | A | * | 7/1997 | Corbin ................ | A47B 23/02 108/49 |
| 5,711,444 | A | * | 1/1998 | Meacham ............ | B65D 11/1833 220/1.5 |
| 5,953,858 | A | * | 9/1999 | Loosen ............... | A01G 9/026 47/66.1 |

(Continued)

*Primary Examiner* — Peter M Poon
*Assistant Examiner* — Shada Mohamed Alghailani
(74) *Attorney, Agent, or Firm* — Haugen Law Firm PLLP

(57) ABSTRACT

A portable street planter that is positionable in a street to divert or divide traffic. The portable street planter provides an aesthetic traffic divider that also serves as a planter basin for plants and trees. The traffic divider may also provide foot and arm support for a bicyclist at rest.

9 Claims, 12 Drawing Sheets

(56) References Cited

U.S. PATENT DOCUMENTS

| | | | |
|---|---|---|---|
| 6,022,168 A | 2/2000 | Junker | |
| 6,216,899 B1* | 4/2001 | Vicari | B65D 19/16 206/600 |
| 6,594,951 B1* | 7/2003 | Reynolds | A01G 9/02 47/39 |
| 6,722,515 B2* | 4/2004 | Rumpel | B65D 11/1833 220/23.4 |
| 6,860,557 B2* | 3/2005 | Jonasson | B60N 2/26 297/253 |
| 6,988,773 B2* | 1/2006 | McMakin | A47C 16/025 297/256.16 |
| 7,296,311 B1* | 11/2007 | Navarrette | A47B 23/02 108/49 |
| 7,303,358 B1 | 12/2007 | Fuller | |
| 7,640,695 B2* | 1/2010 | Bonahoom | A01G 23/043 47/73 |
| 7,770,323 B2* | 8/2010 | Kim | A01G 9/022 47/66.3 |
| 7,805,886 B2* | 10/2010 | Brandstatter | A01G 9/02 47/75 |
| 7,909,000 B1* | 3/2011 | O'Neill | A01K 5/01 119/61.1 |
| 8,091,277 B1* | 1/2012 | Hajianpour | A01G 9/02 47/65.5 |
| 8,109,402 B2* | 2/2012 | Hartwall | B65D 19/18 220/7 |
| 8,113,121 B2 | 2/2012 | Roop | |
| 8,286,638 B1* | 10/2012 | Blackford | A61F 5/37 128/882 |
| 8,382,391 B1 | 2/2013 | Potter et al. | |
| 8,453,379 B1* | 6/2013 | Kumar | A01G 9/02 47/66.6 |
| 8,915,669 B1 | 12/2014 | Guslafson et al. | |
| 9,321,584 B1* | 4/2016 | Schall | A01G 9/02 |
| 9,510,518 B2* | 12/2016 | Shein | A47B 47/0066 |
| 9,644,332 B1 | 5/2017 | Smith | |
| 9,655,307 B2* | 5/2017 | Burmann | A01G 9/02 |
| 9,723,930 B2* | 8/2017 | Burch | A47C 16/02 |
| 9,802,634 B2 | 10/2017 | Lehnertz | |
| 10,030,344 B1 | 7/2018 | Morales Flores et al. | |
| 10,231,386 B2* | 3/2019 | Shein | B65D 7/42 |
| 10,246,840 B2 | 4/2019 | Meek et al. | |
| 10,531,614 B2* | 1/2020 | Stott | A01G 9/02 |
| 10,588,471 B2* | 3/2020 | Naik | G01G 19/52 |
| 10,618,720 B1* | 4/2020 | Schneider | B65D 85/187 |
| 10,745,872 B2* | 8/2020 | Dalton | E01F 9/692 |
| 10,882,663 B2* | 1/2021 | Hartl | B65D 19/38 |
| 2001/0013416 A1* | 8/2001 | Bouchard | A01G 23/062 171/3 |
| 2004/0036331 A1* | 2/2004 | Jonasson | B60N 2/286 297/250.1 |
| 2007/0194022 A1* | 8/2007 | Huggett | B65D 13/04 220/6 |
| 2007/0246991 A1* | 10/2007 | Farah | A47C 16/02 297/423.39 |
| 2008/0163544 A1* | 7/2008 | Boylan | A01G 9/02 47/39 |
| 2008/0217981 A1* | 9/2008 | Ton-That | B62B 9/00 297/423.4 |
| 2008/0290701 A1* | 11/2008 | Adamyan | A47C 16/02 297/174 R |
| 2009/0183429 A1* | 7/2009 | Kim | A01G 9/02 47/66.1 |
| 2010/0254761 A1 | 10/2010 | Wheeler, Jr. | |
| 2011/0018327 A1* | 1/2011 | Abolkheir | A47C 16/02 297/423.1 |
| 2012/0080343 A1* | 4/2012 | Gretz | A01G 9/02 206/423 |
| 2013/0291304 A1* | 11/2013 | Steinberg | A47C 21/00 5/503.1 |
| 2015/0084394 A1* | 3/2015 | Hempstead | A47C 7/506 297/423.39 |
| 2015/0121756 A1* | 5/2015 | Dos Santos | A01G 9/025 47/79 |
| 2015/0195996 A1* | 7/2015 | Schall | B65D 85/52 47/65.5 |
| 2015/0208593 A1* | 7/2015 | Aronow | A01G 9/28 47/65.5 |
| 2015/0336487 A1* | 11/2015 | Blackledge | B60N 2/995 297/250.1 |
| 2017/0105359 A1* | 4/2017 | Shein | A01G 9/026 |
| 2017/0215348 A1* | 8/2017 | Burmann | A01G 9/0299 |
| 2019/0183061 A1* | 6/2019 | Huang | A01G 9/02 |
| 2019/0241314 A1* | 8/2019 | Pawluk | B65D 45/24 |
| 2019/0364745 A1* | 12/2019 | Soutullo | A01G 9/02 |
| 2020/0029505 A1* | 1/2020 | Riley | A01G 9/02 |
| 2021/0037718 A1* | 2/2021 | Ryan | A01G 9/12 |
| 2021/0076574 A1* | 3/2021 | Reiger | A01G 9/02 |

\* cited by examiner

PORTABLE STREET PLANTER

CROSS-REFERENCE TO RELATED APPLICATIONS

This application claims the filing benefit and priority of U.S. Provisional Patent Application Ser. No. 62/724,315 filed Aug. 29, 2018, the contents of which are incorporated herein by reference in its entirety.

FEDERAL SPONSORSHIP

Not Applicable

JOINT RESEARCH AGREEMENT

Not Applicable

TECHNICAL FIELD

This invention pertains generally to street diverters and traffic dividers. More particularly, the present invention relates to aesthetic traffic dividers and channelizers that also serves as a planter basin and optionally a bicyclist support implement.

BACKGROUND

Over the years, traffic separation devices have long been used to direct vehicular traffic along roadways. By way of example, pylons have been used to separate HOV lanes from regular traffic. Road markings, including rumble strips reflective markers and paint have been used to designate and distinguish the various lanes of a roadway. Other devices such as orange cones, barrels, and moveable barriers have been used to block or divert automobiles along streets and roadways. At times the road barriers may be spaced apart or may be aligned continuously along a roadway. Road construction and high use or congestion may dictate the requirements for continuous or intermittent barriers.

More recently, roadways previously used exclusively for automobile traffic have begun sharing the roadway with bicycle and foot traffic. The relative speeds of automobiles versus bicycle and foot traffic have made it desirable to separate these types of traffic on the roadways. Although differentiating traffic signs have been used to separate vehicular traffic from bicycle and pedestrian traffic moving along the same roadway, there is a benefit to reduce the potential of an automobile travelling in a lane designated for bicycles.

Further, many urban areas are adopting dedicated bicycle lanes on streets, and are seeking ways to effectively and efficiently maintain the safety of such dedicated bicycle lanes by providing at least an intermittent physical separation between the bicycle lanes and the remainder of the street handling motorized vehicular traffic. Other urban areas desire to only temporarily divide the roadway. Thus, permanent dividing structures such as concrete barriers are not desirable for these urban areas. Additionally, although devices for physically delineating the designated street's use have been proposed, there remains a need for an aesthetically pleasing delineation that may be temporarily or portably installed in unique arrangements that fit within an array of unique applications.

SUMMARY

Embodiments according to aspects of the invention allow for significant division of vehicle and bicycle travel on a roadway while providing an aesthetic appeal of the traffic divider. The traffic divider of the present invention is of sufficient height, width and weight to make it impractical for a vehicle to drive over or otherwise ignore the diverting aspects of the device. Further, the traffic divider of the present invention may be utilized as a decorative planter and may be mobilized with a forklift, pallet lift, jack or other device to lift or raise and move heavy objects. The traffic divider includes a base and a planter basin attached to the base. Additionally, a foot plate and hand rail may be attached to the base and planter basin.

The base may have a top, a bottom, sidewalls extending between the top and bottom, and ends extending between the top and bottom, wherein the sidewalls include openings through the sidewalls of the base. The planter basin may have a large cavity extending into the planter basin sufficient to support soil and plants or trees. The planter is positioned on the top of the base and may be secured or attached to the base with fasteners or other couplings of known suitable construction. The foot rest is fixed to at least one of the planter basin and base such that a bicyclist may stop adjacent the planter and use the footrest to stabilize the bicycle while also using the planter basin for support. The footrest extends outward beyond the sidewall of the base. Similarly, the handrail is fixed to the planter base such that when a bicyclist stops adjacent the planter the cyclist and use the handrail for stabilization and support. The hand rail may extend upward from an upper portion of the planter basin.

The openings in the sidewall of the base are suitable for receiving forks of a lift. Multiple openings may be formed in the base such that the position of the forks may be adjusted to balance the planter basin on the forks of the lift. Additionally, slits may extend into an end of the base. The slits may also be sized and located to allow the lifting of the portable street planter from an end of the planter. The foot rest may further include a flange for attachment to the basin or base. Alternatively the flange may be sandwiched and held in place between the base and planter basin. Detachable side panels are fixed to the sides of the planter basin to further provide an aesthetically pleasing street divider.

In an embodiment of the invention a plurality of portable street dividers may be positioned in the roadway or street to create an array of portable street planters. Each street planter in the array may at least include a base, planter basin, footrest, and handrail. The base may have a top, bottom, sidewalls extending between the top and bottom, and ends extending between the top and bottom. The sidewalls include openings through the sidewalls of the base that are adapted to receive the forks of a lift. The planter basin may have a cavity extending into the planter basin and having a sufficient volume to support soil, plants and trees. The planter may be positioned on the top of the base. The foot rest may be fixed to at least one of the planter basin and base with known suitable fasteners. Alternatively, the foot rest may be held in place with tabs sandwiched in place between the basin and base and fixed by the weight of the planter basin. The foot rest extends outward beyond the sidewall of the base. The hand rail may be fixed or attached to a top portion of the planter basin and may extend upward from an upper portion of the planter basin. Although the foot rest and handrail may be positioned on either side of the street planter it is recognized that the foot rest and handrail of each street planter of the array of portable street planters may be preferably positioned on a side of the street planter opposite vehicular traffic.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and are not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Figure 1:
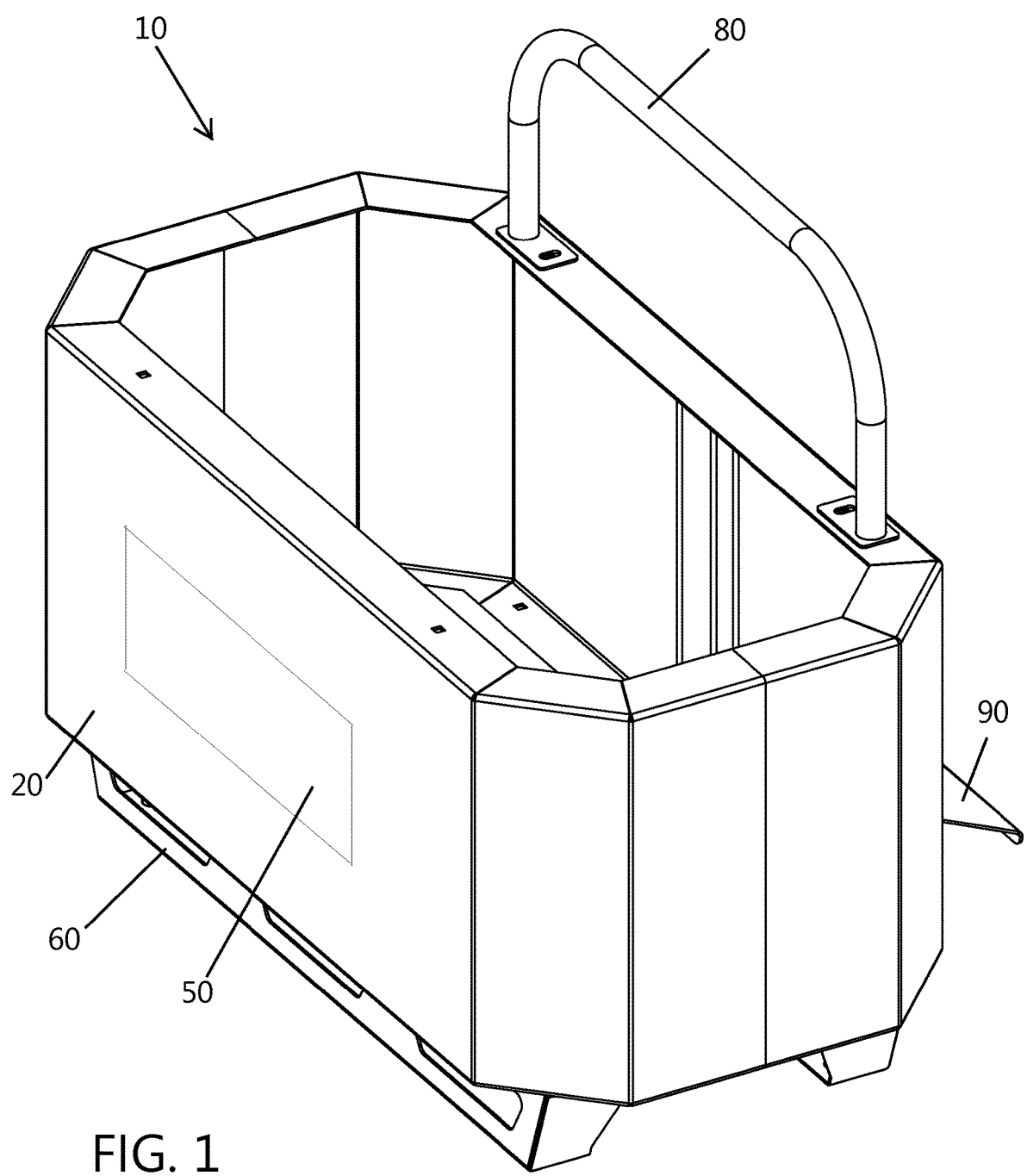
FIG. 1 is a top end perspective view of an embodiment of the portable street planter of the present invention.

Applicant has found that a unique approach for street lane delineation is through the use of a heavy-duty planter basin that may be portably affixed to the street. An example embodiment of the invention is illustrated in FIG. 1, wherein portable street planter 10 includes a planter basin 20 and a base frame 60 for coupling planter basin 20 to a street or roadway 110 (illustrated in FIGS. 2-3). In some embodiments, base frame 60 may be integrally formed with planter basin 20, but more typically base frame 60 may be provided as a separate structure to which planter basin 20 may be secured and removed through fasteners or the like.

An important aspect of the portable street planter 10 of the present invention is its portability, which facilitates flexibility in placement at the street to best fit a needed application. To aid in portability, portable street planter 10 may be fabricated from a relatively lightweight material that, when filled with soil, nevertheless presents a physical barricade preventing intrusion by a motorized vehicle into the delineated bicycle/pedestrian lane. In some embodiments, portable street planter 10 may be fabricated from sheet metal or plate steel, such as seven gauge and eleven gauge sheet metal or plate steel material. When fabricated from seven gauge sheet metal material, a planter 10 having a size of about 48 inches×24 inches×25 inches weighs more than 200 pounds. When filled with soil, however, the same street planter 10 may weigh in excess of 500 pounds. A weight that may be considered sufficient to effectively mitigate intrusion into a delineated lane by motorized passenger vehicles.

Another aspect of the present invention is the aesthetic qualities of the portable street planter 10. Preferably, street planter 10 may be fabricated from a durable, corrosion-resistant material that may be decorated with colorants, paints, coatings, and the like. In the exemplary material of plate steel, it is contemplated that a galvanized coating is provided, and optionally with a powder coat exterior finish. In other embodiments, portable street planter 10 may be fabricated using one or more alternative materials, including polymers and/or metals other than steel. In some embodiments, advertising or aesthetic signage 50 may be secured to a side wall 22 or 24 of planter basin 20 at respective pre-defined attachment points.

Figure 2:
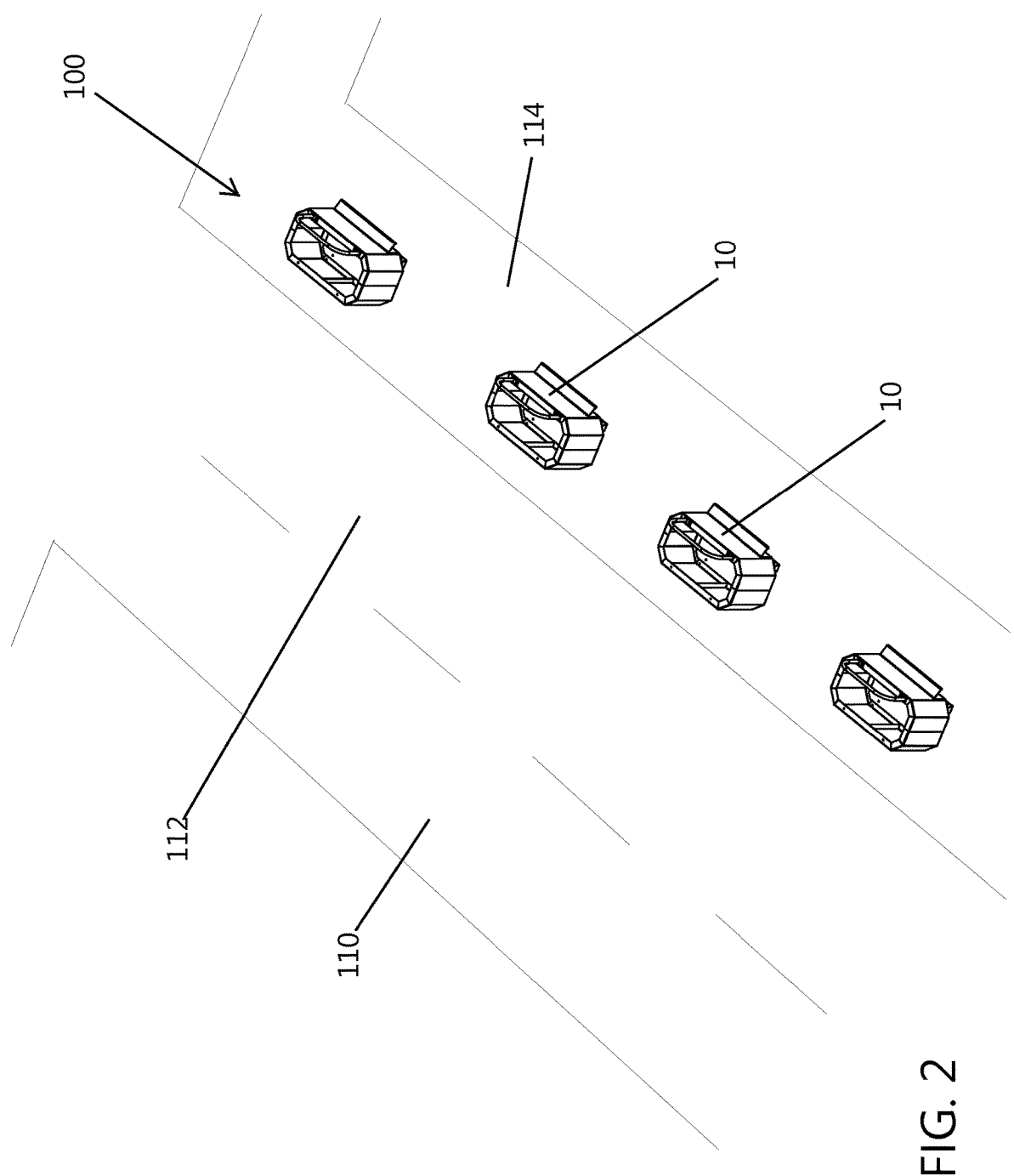
FIG. 2 is a perspective view of an embodiment of an array of portable street planters of the present invention positioned to divide a roadway.
Figure 3:
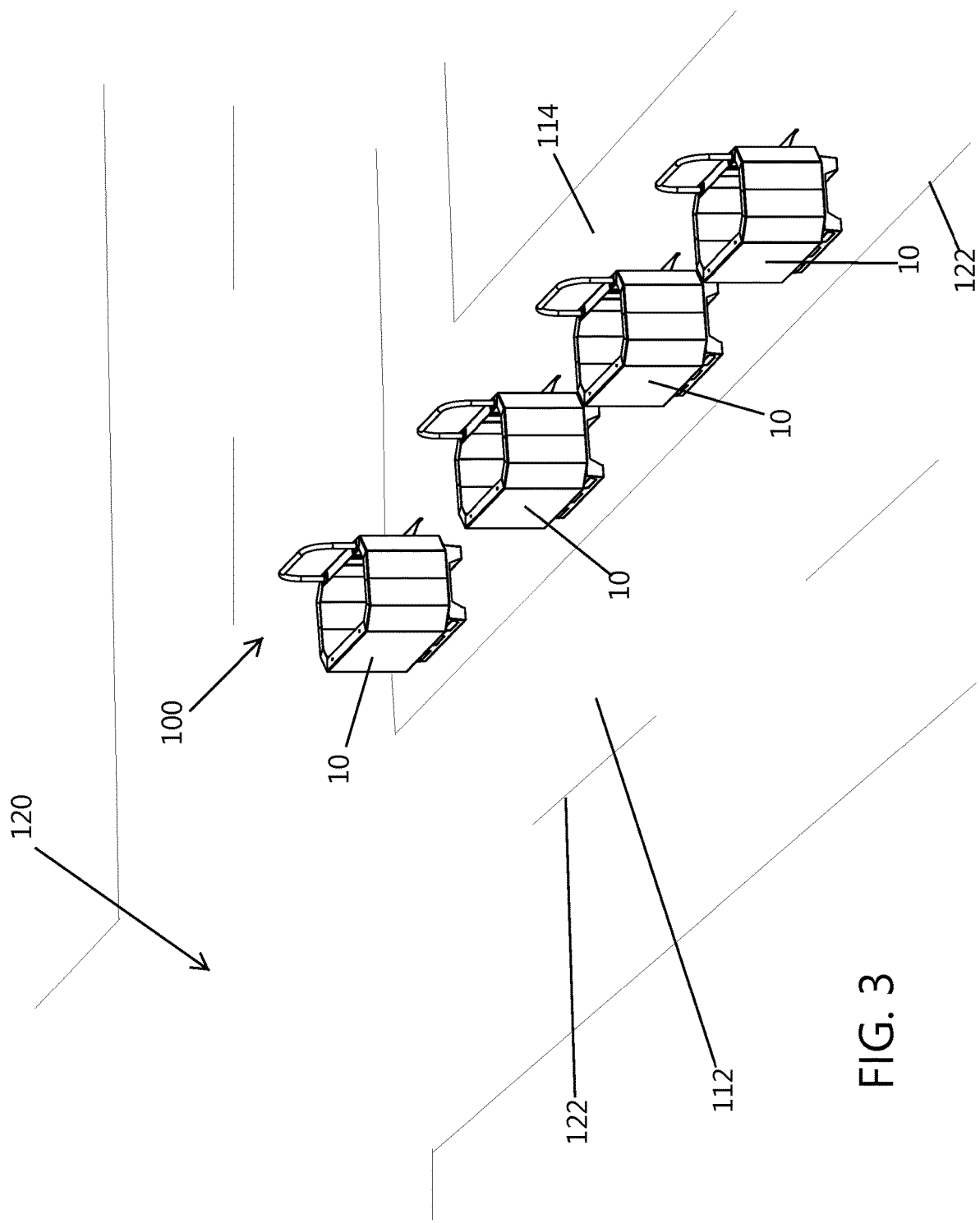
FIG. 3 is a perspective view of an embodiment of an array of portable street planters of the present invention positioned to divide a roadway.
Figure 4:
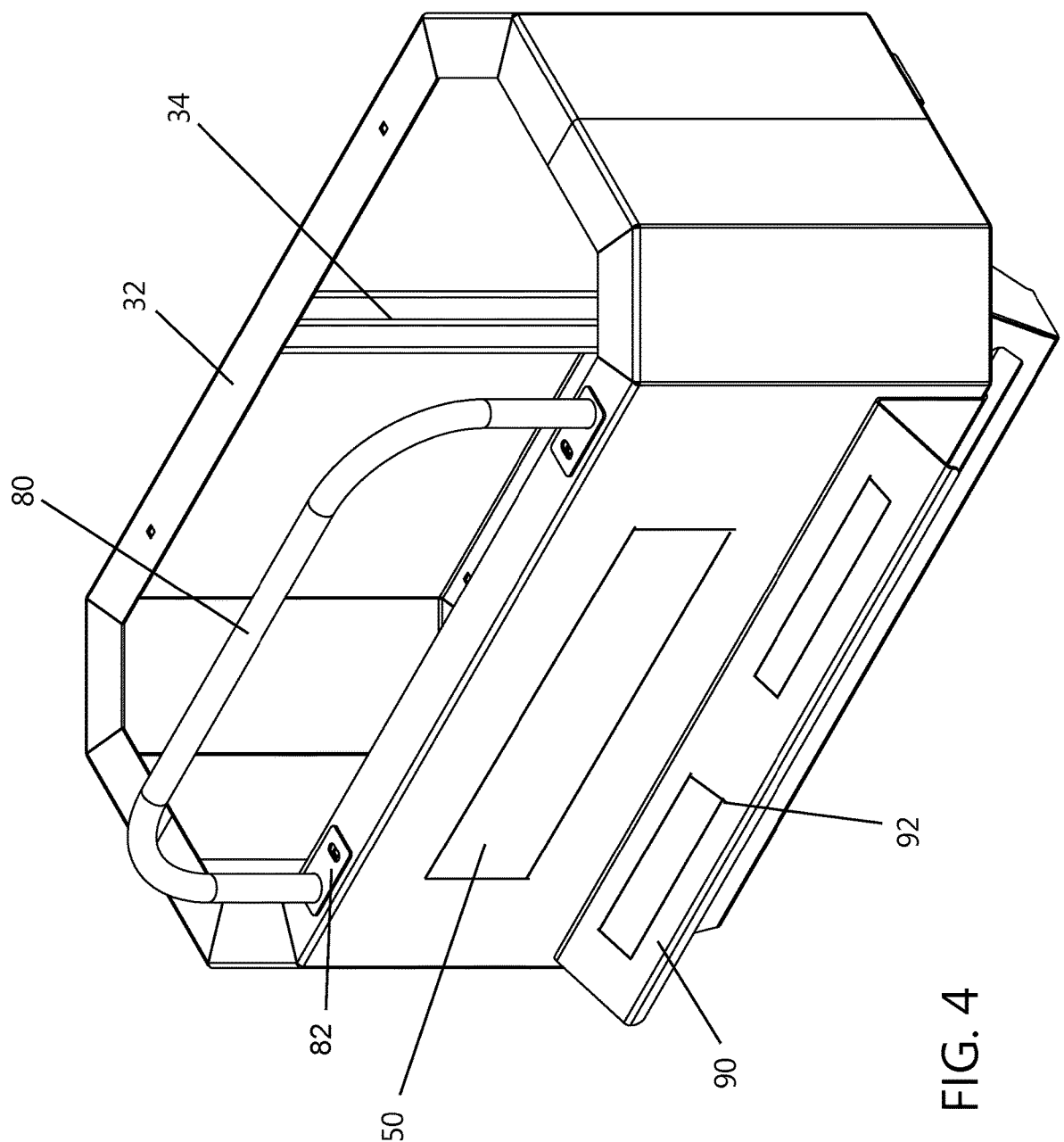
FIG. 4 is a top front right perspective view of an embodiment of a portable street planter of the present invention.
Figure 5:
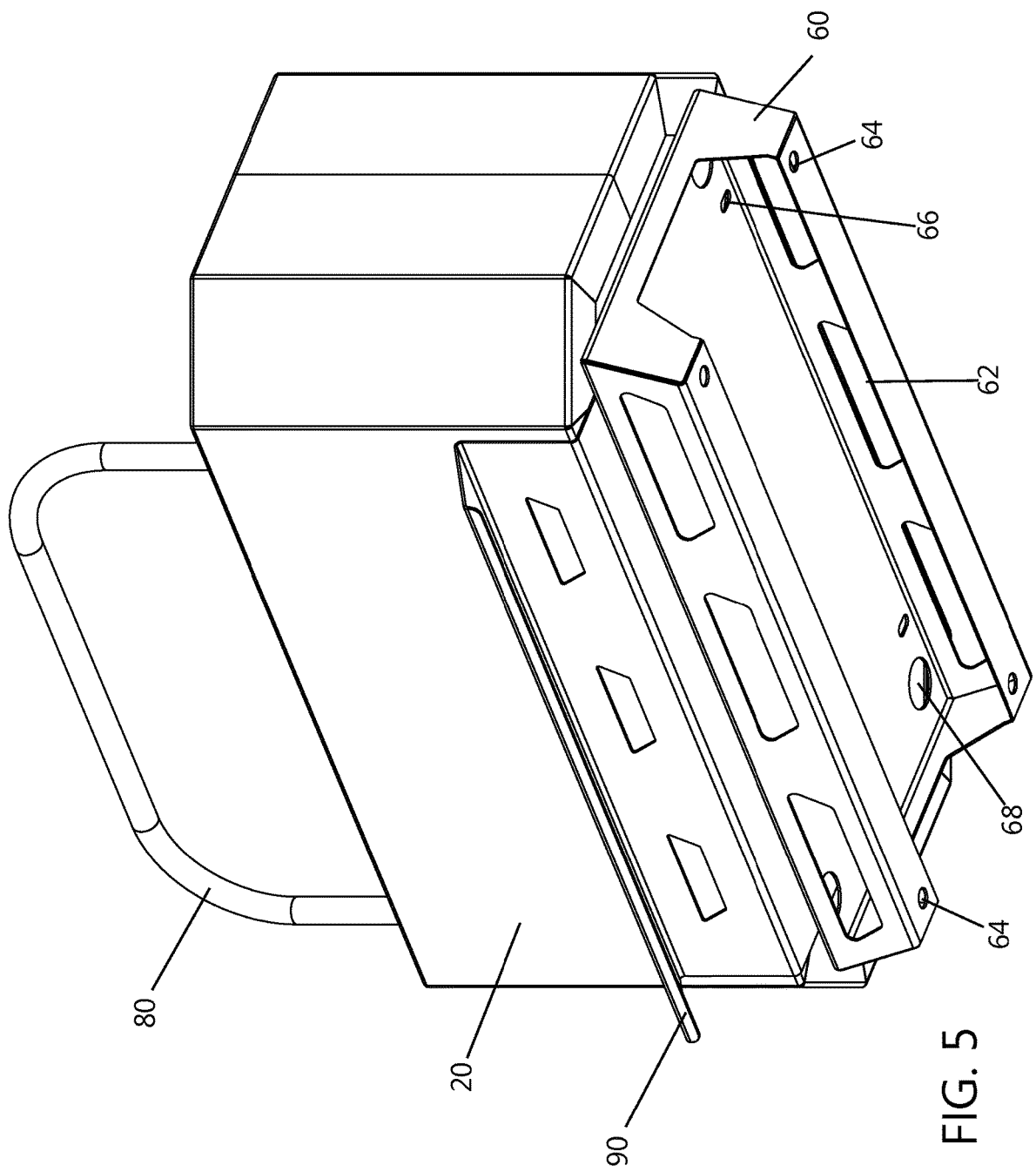
FIG. 5 is a bottom front right perspective view of an embodiment of a portable street planter of the present invention.
Figure 6:
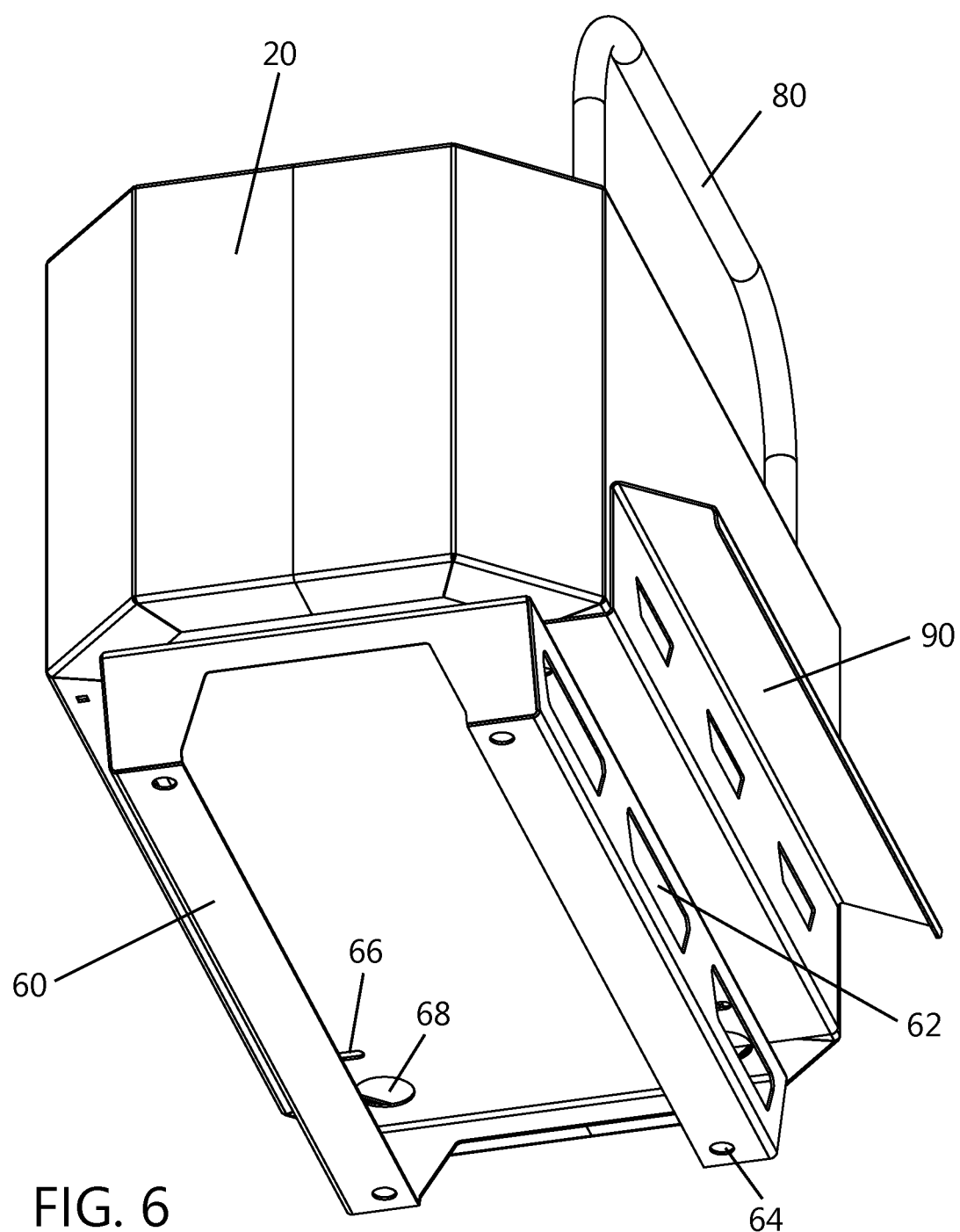
FIG. 6 is a bottom left end perspective view of an embodiment of a portable street planter of the present invention.
Figure 7:
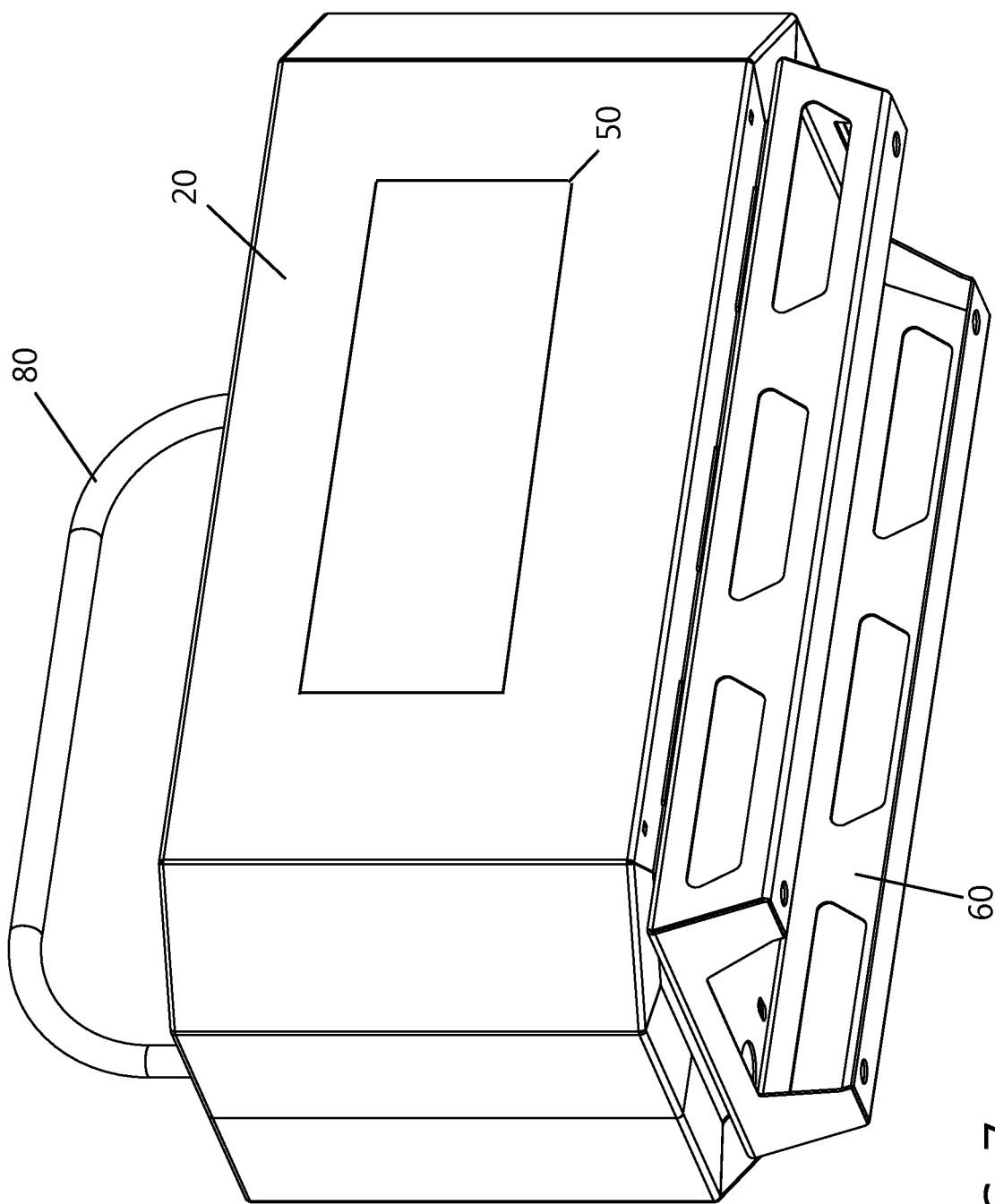
FIG. 7 is a bottom back right perspective view of an embodiment of the portable street planter of the present invention.

With further reference to FIGS. 2 and 3, an array 100 of street planters 10 dividing vehicle and bicycle travel along a roadway 110 is illustrated. A plurality of portable street planters 10 may be spaced apart and aligned along a roadway 110 to thereby divide the roadway into an automobile traffic side 112 and a bicycle side 114. The roadway may include intersections 120 and road markings 122 may further delineate the various portions of the roadway and its intended use. Those skilled in the art will appreciate that various forms of road markings 122 may be utilized, including without limitation, rumble strips, reflective markers, paint, stones, thermo-plastic strips or polymer tape. The array 100 of planters 10 are spaced apart a sufficient distance to provide an aesthetic appeal to the array while maintaining a spacing that makes it improbable that an automobile driven under normal control could divert into the bicycle side 114 of the roadway.

With reference to FIGS. 4-7, embodiments of the portable street planter 10 according to aspects of the invention will be further described. The planter 10 includes basin 20 and base frame 60. A hand rail 80 and foot rest 90 may be attached to the planter 10. An advertising plate or aesthetic signage 50 may be attached to the sides or ends of the basin. The signage 50 may be attached in many suitable ways. By way of example, the signage may include magnetic properties such that the sign adheres to the metal sides or ends of the basin. Alternatively, an adhesive may be utilized or the sign itself may be made from a material that adheres well to metal surfaces. One exemplary material has been used in the past as vehicle wraps and is well suited for this application as well.

The basin 20 includes a cavity 36 into which soil may be placed and into which shrubbery, plants or trees may be planted. The inner sides of the cavity 36 may include vertically extending inner side supports 34. The bottom of the cavity 36 may include drain holes to allow water to adequately drain through the soil and out of the bottom of the basin 20. The base frame 60 may include apertures 64 extending through a bottom of the base to provide an attachment point to secure the base 60 to roadway 110. Apertures 66 extend through a top portion of the base 60 and are suitable for use as attachment points to secure the basin 20 to the base 60. Apertures 68 are also formed in the top portion of the basin. Apertures extending through both the planter basin 20 and the base 60 provide a passageway to allow fluids to drain from the planter basin 20 onto the roadway rather than pooling in the bottom of the basin or between the basin and the base. The foot rest 90 may include a grip surface 92 that may be utilized by a cyclist that rests against the planter 10.

Figure 8:
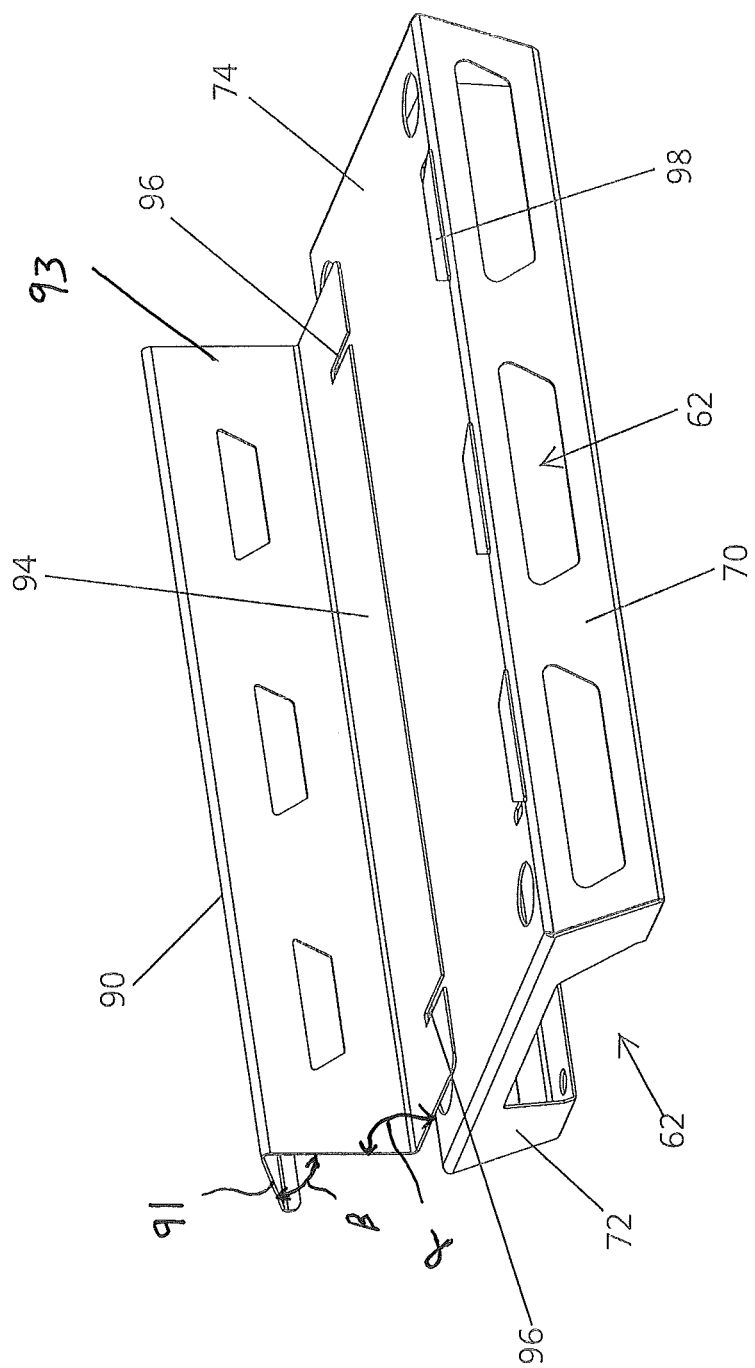
FIG. 8 is a back perspective view of an embodiment of the footrest and base of the present invention showing the footrest and spacers positioned on a top portion of the base.
Figure 9:
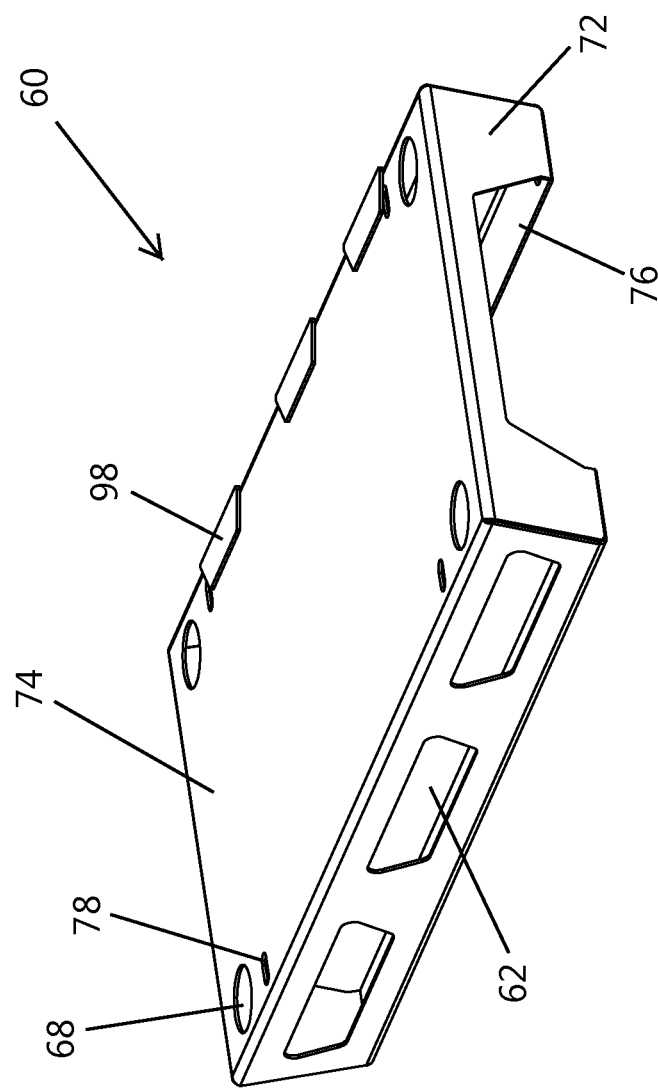
FIG. 9 is a perspective view of a the base of the portable street planter of the present invention shown with spacers positioned on a top portion of the base.
Figure 10:
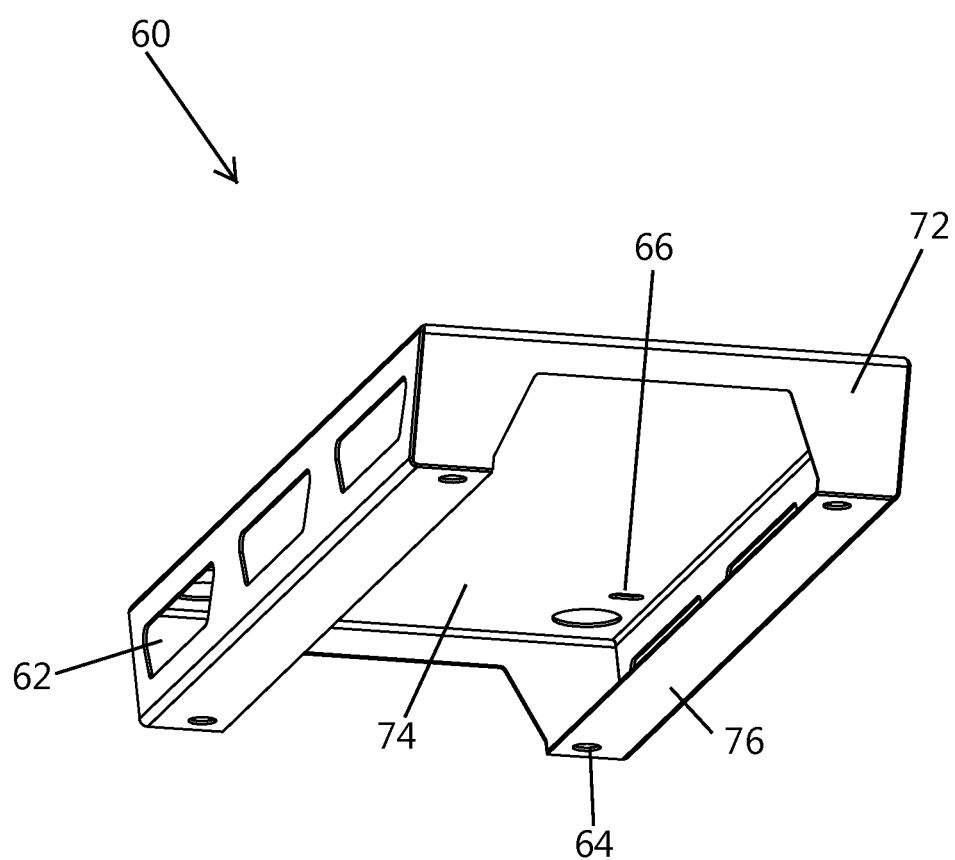
FIG. 10 is a bottom end perspective view of the base of the portable street planter of the present invention.

With reference to FIGS. 8-10 the base frame 60 includes a top 74, bottom 76, sides 70 and ends 72. The base frame 60 may be formed from a sheet metal that is die cut to allow for bending of the sheet metal to thereby form the top 74, sides 70, bottom 76 and ends 72. The sheet metal may be further die cut or otherwise have material removed to provide for apertures 64, 66, and 68. The fork lift receptacles 62 may be cut into the sides 70 or may be formed when the sheet metal is bent to form the sides and ends. In an example embodiment, base frame 60 may be secured to the street 110 or other surface with anchor bolts extending through anchor points 64 in base frame 60. Fasteners, such as carriage bolts, may be used to secure planter basin 20 to base frame 60 through attachment points 66 and aligned attachment points 38 in planter basin 20. Foot rest 90 may also be constructed from a sheet metal that is die cut and bent. Foot rest 90 may include a foot plate 91 and a flange 94 that is positioned between the base 60 and basin 20. The flange 94 extends at a first angle "α" from a brace region 93, and the foot plate 91 extends at a second angle "β" from the brace region 93. The flange 94 may include attachment slots 96 extending through the flange 94 and positioned to align with apertures 78 extending through a top 74 of the foot rest 90. Spacers 98 may be positioned on the top of the base 60 at a side opposing the foot rest 90. The thickness of the foot rest 90 and spacers 98 may be equal such that when the planter basin 20 is positioned on them, the basin is level and stable relative to the base 60. Those skilled in the art will appreciate that the weight of the planter basin 20 may be sufficient to securely sandwich the flange 94 of the foot rest 90 between the planter basin 20 and the base 60, however, carriage bolts or other fasteners may be utilized to secure the basin 20 to the base 60.

To further assist in the portability aspect described above, base frame 60 may be provided with a plurality of receptacles or openings 62 that may be specifically sized, configured, and spaced apart to receive the forks of a forklift machine. The openings may be formed through the sides 70 or ends 72 of the base 50. In this manner, base frame 50 alone, or in combination with planter basin 20, may be easily transported from a carrier vehicle to an installation position.

Figure 11:
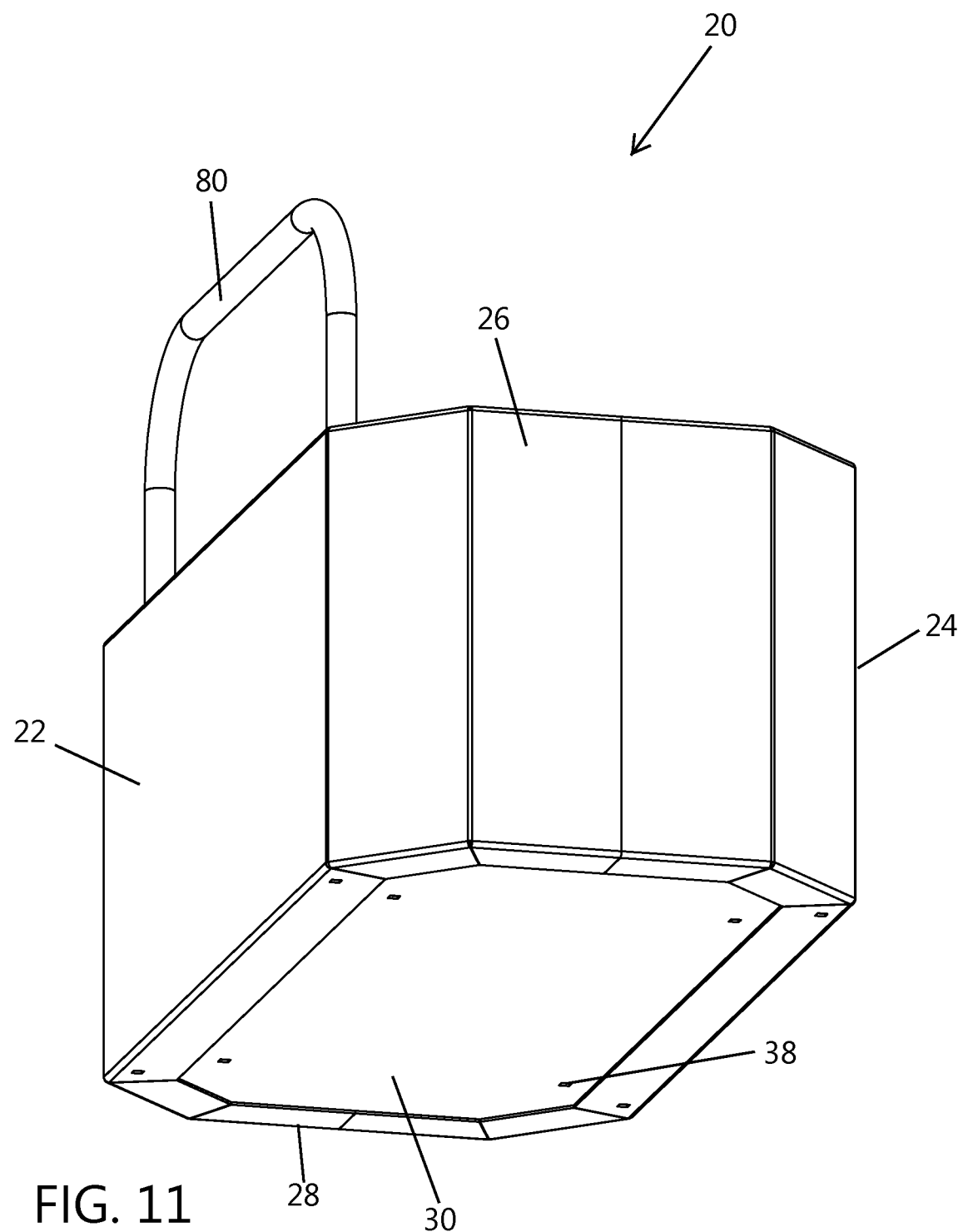
FIG. 11 is a bottom end perspective view of a planter basin of the portable street planter of the present invention.
Figure 12:
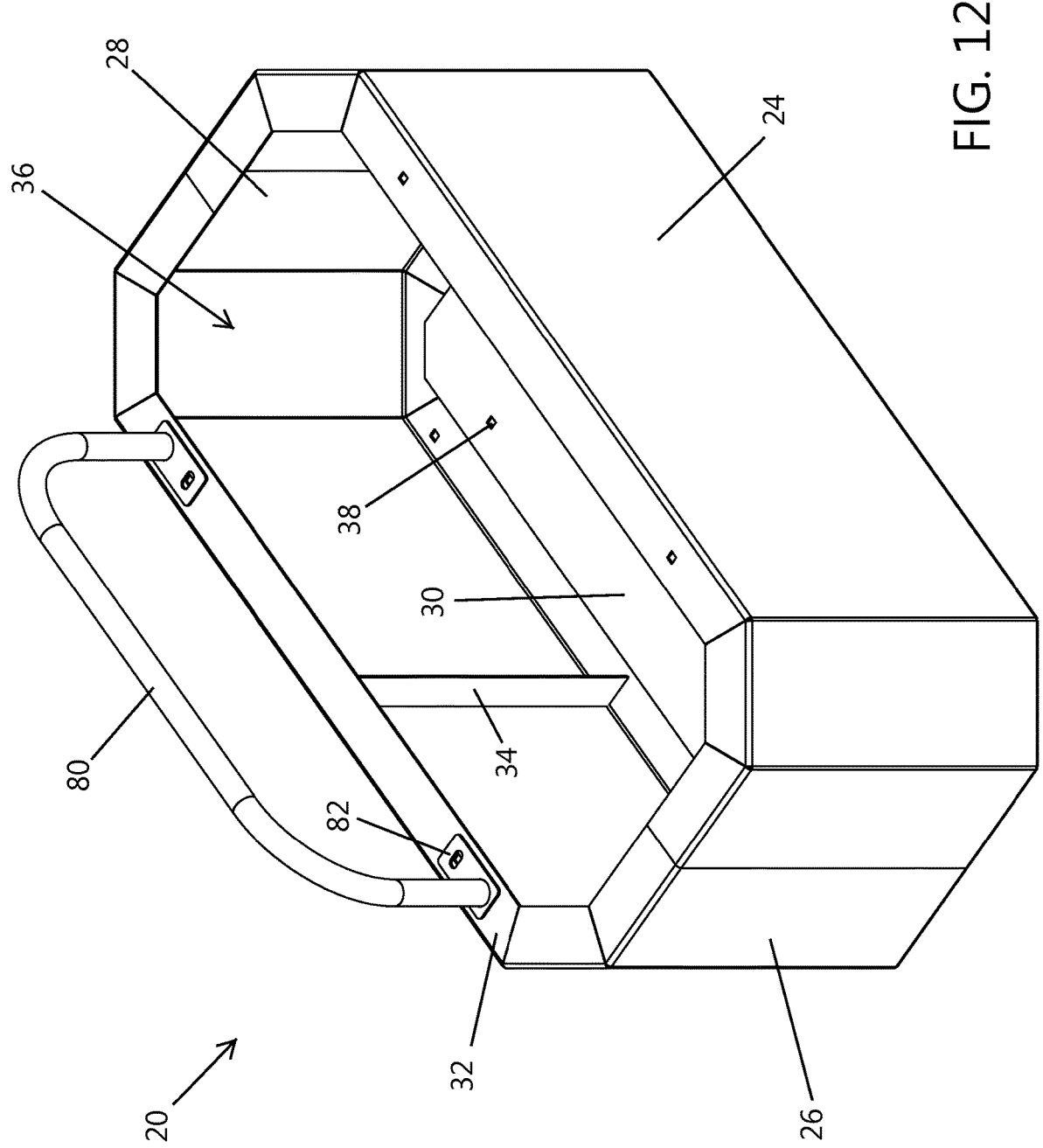
FIG. 12 is an upper back perspective view of a planter basin of the portable street planter of the present invention.

With reference to FIGS. 11 and 12, planter basin 20 includes side walls 22 and 24 and ends 26 and 28 that defines a cavity 36 into which soil and plants may be placed. The basin 20 further includes a bottom 30 and top ledge 32. Apertures 38 extend through the bottom 30 and provide an attachment point for attaching the basin 20 to the base 60. In some embodiments, portable street planter 10 may include a handrail 80 and/or a foot rest 90 for supporting a bicyclist, for example, stopped at an intersection. Handrail 80 and foot rest 90 may be specifically dimensioned to provide a convenient location for a bicyclist to hold or brace against while remaining mounted on their bicycle.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A portable street planter for separating traffic on a roadway, the portable street planter comprising:
    a base frame having a top and first and second sides, with a bottom of the first and second sides being positionable on the roadway for supporting the top in spaced relation to the roadway, at least one of the first and second sides having an opening that is specifically configured for receiving therein one or more forks of a forklift;
    a planter basin supported by the base frame and having a bottom and a sidewall extending from the bottom and terminating in a top edge, the bottom and side wall together defining a cavity that is configured to receive soil and one or more plants therein;
    a foot rest secured to one or more of the base frame and the planter basin, the foot rest including a foot plate and a flange, wherein the flange is securable between the top of the base frame and the bottom of the planter basin, the flange defining a planar region of the foot rest that extends at an angle of less than 180° from a brace region of the foot rest, wherein the brace region connects the foot plate to the flange, and the foot plate is planar and extends at an acute angle from the brace region and away from the cavity and separated from the cavity by the sidewall of the planter basin, wherein a surface of the foot plate is configured to support a user's foot, and the foot rest being proximate to the base frame; and
    a hand rail extending from the top edge of the planter basin, with a portion of the hand rail being spaced apart from the planter basin.

2. The portable street planter as recited in claim 1, wherein the top of the base frame has an upper surface and an opposed lower surface, with the lower surface being spaced apart from the roadway when the base frame is positioned on the roadway.

3. The portable street planter as recited in claim 2, including a plurality of openings in at least one of the first and second sides, wherein each of the openings are specifically configured for receiving therein one or more forks of a forklift.

4. The portable street planter as recited in claim 3, wherein the planter basin and the base frame are constructed of sheet metal.

5. The portable street planter as recited in claim 4, wherein the planter basin is secured to the top of the base frame with one or more fasteners.

6. The portable street planter as recited in claim 5, including attachments for joining the base to the roadway.

7. The portable street planter as recited in claim 1, further including detachable side panels secured to an exterior surface of the planter basin sidewall.

8. The portable street planter as recited in claim 1, wherein the portion of the hand rail being spaced apart from the planter basin is substantially parallel to the top edge of the planter basin.

9. The portable street planter as recited in claim 5, including a first drain hole in the bottom of the planter basin, and a second drain hole in the top of the base frame, wherein the first and second drain holes are operably alignable when the planter basin is secured to the top of the base frame, the first and second drain holes being specifically configured to permit water drainage out from the cavity of the planter basin and through the top of the base frame.

* * * * *